US012614087B2

(12) United States Patent
Matsuura et al.

(10) Patent No.: US 12,614,087 B2
(45) Date of Patent: Apr. 28, 2026

(54) OPTIMIZATION APPARATUS, OPTIMIZATION METHOD, AND NON-TRANSITORY COMPUTER-READABLE STORAGE MEDIUM

(71) Applicant: FUJITSU LIMITED, Kawasaki (JP)

(72) Inventors: Satoshi Matsuura, Kawasaki (JP); Takeshi Mishina, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 17/189,943

(22) Filed: Mar. 2, 2021

(65) Prior Publication Data

US 2021/0334680 A1 Oct. 28, 2021

(30) Foreign Application Priority Data

Apr. 24, 2020 (JP) ................................. 2020-077844

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 11,113,620 B2 * | 9/2021 | Neven ..................... | G06N 10/60 |
| 2016/0062951 A1 | 3/2016 | Yoshimura et al. | |
| 2018/0107172 A1 | 4/2018 | Takatsu | |

(Continued)

FOREIGN PATENT DOCUMENTS

| | | |
|---|---|---|
| EP | 3637202 A1 | 4/2020 |
| JP | 2016-51349 A | 4/2016 |

(Continued)

OTHER PUBLICATIONS

Yamaoka, Masanao, et al. "A 20k-spin Ising chip to solve combinatorial optimization problems with CMOS annealing." IEEE Journal of Solid-State Circuits 51.1 (Year: 2015).*

(Continued)

*Primary Examiner* — Adam C Standke
(74) *Attorney, Agent, or Firm* — Fujitsu Intellectual Property Center

(57) ABSTRACT

An optimization apparatus includes a processor. The processor configured to calculate a change amount of energy represented by an evaluation function of a case of changing a state of any one of a plurality of state variables so as to increase or decrease a value by 1 in a case of a state variable taking multiple values, the evaluation function representing the energy including the plurality of state variables, determine whether to set a state change in the state variable as a candidate according to a correlation between a threshold and a total change amount, stochastically determine whether to adopt the state change set as the candidate, calculate post-transition energy after executing a state transition of the state variable according to the state change, and obtain minimum energy by setting the post-transition energy as the minimum energy when the post-transition energy is less than the minimum energy.

5 Claims, 10 Drawing Sheets

(56) References Cited

U.S. PATENT DOCUMENTS

| | | |
|---|---|---|
| 2019/0204794 A1 | 7/2019 | Matsubara et al. |
| 2020/0074279 A1 | 3/2020 | Koyama et al. |
| 2020/0110790 A1 | 4/2020 | Yoneoka |
| 2020/0117697 A1 | 4/2020 | Miyazawa et al. |

FOREIGN PATENT DOCUMENTS

| | | |
|---|---|---|
| JP | 2018-063626 A | 4/2018 |
| JP | 2019-78777 A | 5/2019 |
| JP | 2020-35179 | 3/2020 |
| JP | 2020-57306 | 4/2020 |

OTHER PUBLICATIONS

Yoshioka, Nobuyuki, Yutaka Akagi, and Hosho Katsura. "Transforming generalized Ising models into Boltzmann machines." Physical Review E 99.3 (Year: 2019).*

Bausch, Johannes. "Classifying Data with Local Hamiltonians." arXiv preprint arXiv:1807.00804 (Year: 2018).*

Yamaoka, Masanao et al. "A 20k-spin Ising ship to solve combinatorial optimization problems using CMOS annealing." IEEE Journal of Solid-State Circuits 51.1 (Year: 2015).*

Wei, Shao et al., "Multiple-Try Simulated Annealing Algorithm for Global Optimization", Mathematical Problems in Engineering, vol. 2018, XP055820066, pp. 1-11, Jul. 17, 2018, Retrieved from the Internet: URL:https://downloads.hindawi.com/journals/mpe/2018/9248318.pdf [retrieved on Aug. 4, 2021].

Extended European Search Report dated Aug. 13, 2021 for corresponding European Patent Application No. 21159239.9, 9 pages.

JPOA—Office Action of Japanese Patent Application No. 2020-077844 mailed on Jan. 30, 2024 with Full Machine Translation.

CNOA —Office Action of Chinese Patent Application No. 202110281645.7 mailed on Jan. 27, 2025 with full English translation [19 pages]. **US2020/0074279A1 cited in the CNOA was previously submitted in the IDS filed on Feb. 15, 2024.

EPOA—Office Action of European Patent Application No. 21159239.9 mailed on Oct. 25, 2024 [13 pages]. **References cited in the EPOA were previously submitted in the IDS filed on Oct. 1, 2021 and Feb. 15, 2024.

EPOA—Summons to Oral Proceedings of European Patent Application No. 21159239.9 mailed on Mar. 4, 2025 [14 pages]. ** References cited in the EPOA were previously submitted in the IDS filed on Mar. 2, 2021 and Oct. 1, 2021.

CNOA—Chinese Office Action dated May 24, 2025 for corresponding Chinese Patent Application No. 202110281645.7 with English Translation.

* cited by examiner

FIG. 2

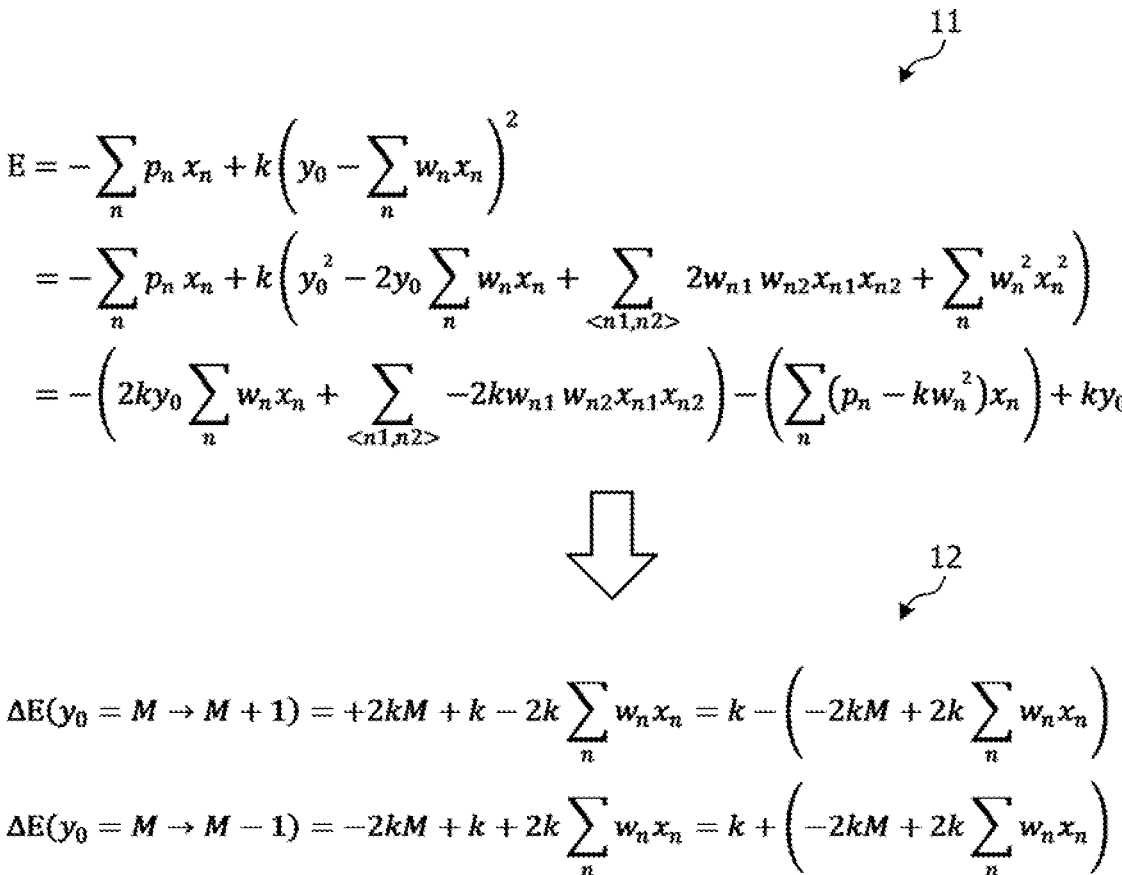

$$E = -\sum_n p_n x_n + k\left(y_0 - \sum_n w_n x_n\right)^2$$

$$= -\sum_n p_n x_n + k\left(y_0^2 - 2y_0\sum_n w_n x_n + \sum_{<n1,n2>} 2w_{n1}w_{n2}x_{n1}x_{n2} + \sum_n w_n^2 x_n^2\right)$$

$$= -\left(2ky_0\sum_n w_n x_n + \sum_{<n1,n2>} -2kw_{n1}w_{n2}x_{n1}x_{n2}\right) - \left(\sum_n (p_n - kw_n^2)x_n\right) + ky_0^2$$

$$\Delta E(y_0 = M \to M+1) = +2kM + k - 2k\sum_n w_n x_n = k - \left(-2kM + 2k\sum_n w_n x_n\right)$$

$$\Delta E(y_0 = M \to M-1) = -2kM + k + 2k\sum_n w_n x_n = k + \left(-2kM + 2k\sum_n w_n x_n\right)$$

| #LOCAL FIELD | SPIN STATE | LOWER LIMIT VALUE | UPPER LIMIT VALUE | CONSTRAINT TERM COEFFICIENT |
|---|---|---|---|---|
| 1814450 | 0 | 0 | 1 | 0 |
| 1893950 | 0 | 0 | 1 | 0 |
| 2400064 | 0 | 0 | 1 | 0 |
| 2022446 | 0 | 0 | 1 | 0 |
| 2287550 | 0 | 0 | 1 | 0 |
| 617105 | 0 | 0 | 1 | 0 |
| 38000 | 0 | 0 | 190 | 100 |
| ... | | | | |

CONTROL CIRCUIT

FIG. 9
14
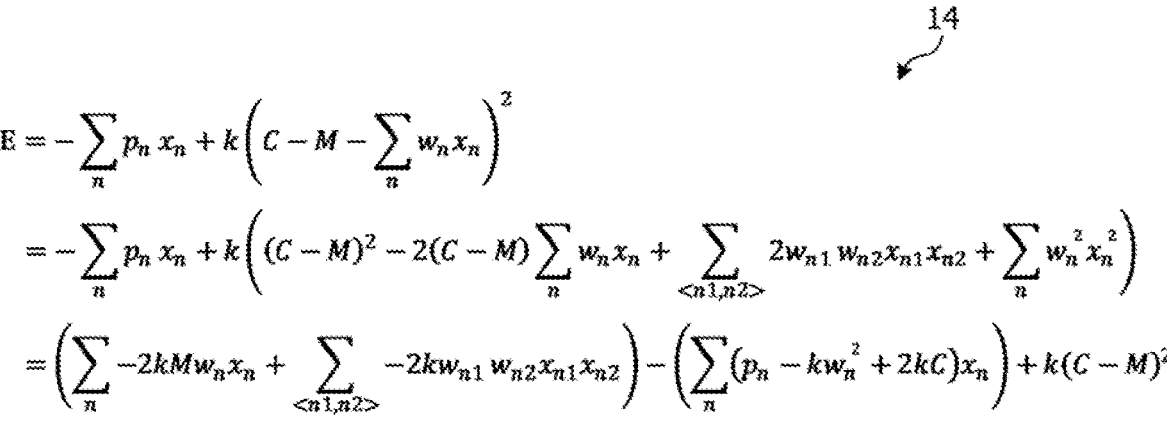
$$E = -\sum_n p_n x_n + k\left(C - M - \sum_n w_n x_n\right)^2$$
$$= -\sum_n p_n x_n + k\left((C-M)^2 - 2(C-M)\sum_n w_n x_n + \sum_{<n1,n2>} 2w_{n1}w_{n2}x_{n1}x_{n2} + \sum_n w_n^2 x_n^2\right)$$
$$= \left(\sum_n -2kMw_n x_n + \sum_{<n1,n2>} -2kw_{n1}w_{n2}x_{n1}x_{n2}\right) - \left(\sum_n (p_n - kw_n^2 + 2kC)x_n\right) + k(C-M)^2$$
15
$$\Delta E(M \to M+1) = k - \left(2kC - 2kM - 2k\sum_n w_n x_n\right)$$
$$\Delta E(M \to M-1) = k + \left(2kC - 2kM - 2k\sum_n w_n x_n\right)$$

OPTIMIZATION APPARATUS, OPTIMIZATION METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-77844, filed on Apr. 24, 2020, the entire contents of which are incorporated herein by reference.

FIELD

The embodiments discussed herein are related to an optimization apparatus, an optimization method, and a non-transitory computer-readable storage medium.

BACKGROUND

In our society, a large number of "combinatorial optimization problems" is present, in which an optimum combination is selected from among combinations of large number of elements under constraints such as limited people, time, or the like, regarding disaster recovery procedures, delivery route optimization, or the like. One of these methods of searching for an optimum solution of the combinatorial optimization problem is an Ising calculation device obtained by applying a simulated annealing method that is one type of Monte Carlo method and Is a method for stochastically obtaining a solution using a random number value.

The Ising calculation device is a calculation device that searches for a combination of variables that minimizes energy of an Ising model expressed by a predetermined evaluation formula. There are some cases where the variables are referred to as a spin, values of the variables are referred to as a spin state, and a transition of the spin state is referred to as inversion.

An Ising calculation device 1 is an optimizer that searches for a combination $(x_0, x_1, \ldots, x_n)$ of variables $x_i$ that minimizes energy of the Ising model expressed by the formulas (1) to (4) that are evaluation functions. Here, a variable xi in the formula (1) is a variable representing the i-th spin state (also called a state variable) and $x_j$ in the formula (1) is a variable representing the j-th spin state. The variable $x_i$ and $x_j$ take a value of zero or one. $W_{ij}$ is an interaction coefficient and bi is a value called magnetic field term.

[Formula. 1]

$$E = -\sum_{<i,j>} W_{ij}\, x_i x_j - \sum_i b_i x_i + c \qquad (1)$$

[Formula. 2]

$$\Delta E_i = \begin{cases} -h_i(\text{for } x_i = 0 \to 1) \\ +h_i(\text{for } x_i = 1 \to 0) \end{cases} \qquad (2)$$

[Formula. 3]

$$h_i = \sum_j W_{ij} x_j + b_i \qquad (3)$$

-continued

[Formula. 4]

$$\delta h_i = \begin{cases} +W_{ij}(\text{for } x_j = 0 \to 1) \\ -W_{ij}(\text{for } x_j = 1 \to 0) \end{cases} \qquad (4)$$

Here, E represents energy, and $\Delta E_i$ represents an energy change amount in a case where i-th $x_i$ is inverted (formula (2)). Furthermore, $h_i$ represents a local field with i-th spin (formula (3)), and $\delta h_i$ represents a change amount of the local field with i-th spin (formula (4)). Furthermore, in the following description, there are some cases where the energy change amount is represented as $\Delta E$.

By formulating an actual problem into the Ising model energy formula expressed by the formula (1) and searching for a combination of spin states that minimizes the energy by the Ising calculation device, various types of combinatorial optimization problems can be solved.

The Ising calculation device determines, for each spin, presence or absence of inversion on the basis of an inversion determination formula, sequentially transitions the state, and searches for the minimum energy. Then, by formulating the actual problem into the Ising model energy formula and searching for the combination of spin states that minimizes the energy by the Ising calculation device, various types of combinatorial optimization problems can be solved.

Here, a minimum energy search method using the simulated annealing method will be simply described. The Ising calculation device starts a search from an initial state in which zero or one is assigned to each variable of the evaluation function expressing a problem to be solved. Then, the Ising calculation device selects a state close to a current state from the current state of the combination of the variables, and considers a state transition. The state close to the current state is, for example, a state in which a state of one variable is changed. Next, the Ising calculation device calculates the energy change amount for the state, and stochastically selects whether or not to adopt the state transition or to maintain the original state without adopting the state transition according to the calculated value. When setting an adoption probability of decreasing the energy to be higher than an adoption probability of increasing the energy, the state is averagely changed in the direction of decreasing the energy, and the Ising calculation device can finally reach the optimum solution or reach the energy close to the optimum solution. If deterministically adopting the state transition in the case of decreasing the energy and not adopting the state transition in the case of Increasing the energy, the change in the energy monotonously decreases with respect to time in a broad sense. However, when the Ising calculation device reaches a local solution, no more state transition occurs, and it is difficult to expect to reach the optimum solution. Therefore, in the search in the combinatorial optimization problem, it is important to stochastically determine whether or not to adopt the state transition.

Moreover, there may be a range constraint for variables when the Ising calculation device solves a problem. As such a problem, for example, there is a knapsack problem in which target baggage to be put in a knapsack is selected within a range not exceeding the maximum capacity of the knapsack from a plurality of pieces of baggage with determined "capacity" and "value", and a combination that maximizes the value of the put baggage is obtained. When solving such a problem to which the range constraint for variables is given, a known Ising calculation device introduces an auxiliary spin representing the range constraint into an evaluation formula.

For example, to solve the knapsack problem using the Ising calculation device, the target to be minimized needs to be expressed by the mathematical formula (1). Therefore, it is assumed that whether or not to put each piece of baggage in the knapsack is represented by the variable $x_i$, and the baggage is not put in the knapsack in the case of $x_i=0$, and the baggage is put in the knapsack in the case of $x_i=1$. Moreover, the capacity of each piece of baggage is represented by $w_i$ and the value of the baggage is represented by $p_i$, and the target to be minimized is represented by a value obtained by adding a minus sign to a total value of items put in the knapsack. The value is expressed by the first term of the following formula (5).

[Formula. 5]

$$E = -\sum_n p_n\, x_n + k\left(\sum_m y_m - \sum_n w_n x_n\right)^2 \quad (5)$$

Moreover, a condition of not exceeding the maximum capacity of the knapsack is added as a constraint term. Since the condition of not exceeding the maximum capacity of the knapsack means that the total capacity of the loaded baggage is equal to a certain value in a range that is equal to or larger than 0 and equal to or smaller than the maximum capacity, the second term is added as in the formula (5) so that a value k of the constraint term is added as a penalty in the case where the total capacity becomes a value other than the certain value. Here, y0 to ym are auxiliary spins, and the total number of auxiliary spins having a value of 1 represents the range constraint.

Note that, in performing the annealing method, there is a known technology of stochastically selecting a transition state after adding an offset to an energy change value so that an offset value of a local solution with minimum energy becomes larger than an offset value in a case where the energy is not minimum.

Japanese Laid-open Patent Publication No. 2018-63626 is disclosed as related art.

SUMMARY

According to an aspect of the embodiments, an optimization apparatus includes a memory; and a processor coupled to the memory and configured to: control a temperature value indicating a temperature, calculate a change amount of energy represented by an evaluation function of a case of changing a state of any one of a plurality of state variables so as to Increase or decrease a value by 1 in a case of a state variable taking multiple values, the evaluation function representing the energy including the plurality of state variables in which the state variable is included, determine whether to set a state change in the state variable as a candidate according to a correlation between a threshold and a total change amount, the threshold being calculated based on the temperature value and a random number value, the total change amount being obtained by the calculated change amount of energy, stochastically determine whether to adopt the state change set as the candidate, calculate post-transition energy after executing a state transition of the state variable according to the state change, and obtain minimum energy by setting the post-transition energy as the minimum energy when the post-transition energy is less than the minimum energy.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a calculation example regarding auxiliary spins according to a first embodiment;

FIG. 4 is a diagram illustrating an example of a file for an initial setting instruction;

FIG. 58 is a flowchart of an optimum solution search process by an Ising calculation device according to the first embodiment;

FIG. 9 is a diagram illustrating a calculation example regarding the auxiliary spins according to a modification of the first embodiment.

DESCRIPTION OF EMBODIMENTS

In the related art, in the method of introducing the auxiliary spins and solving a problem in which the range constraint for variables is given, the auxiliary spins are prepared according to the number of possible values. Therefore, even if the number of range constraint conditions is one, many spins are used. For example, in a case of formulating a knapsack problem of putting six items in a knapsack with the maximum value of 190, using the auxiliary spins, 190 spins are introduced for the range constraint condition.

Furthermore, in this case, there is also a method of representing the range constraint by a value obtained by subtracting the value of the auxiliary spins from the maximum capacitance of the knapsack instead of representing the entire range of 0 to 190 by the 190-bit auxiliary spins, and narrowing the auxiliary spins to 10 bits and allowing 180 to 190, for example. However, this method still uses many auxiliary spins. Furthermore, the range is predicted and narrowed down before the problem is solved, but if this prediction is incorrect, the solution may not be reached.

From the above discussion, when many spins are allocated to the auxiliary spins from among limited spins usable by the Ising calculation device, the scale of a problem to be handled is limited. Furthermore, when searching for the minimum energy, the auxiliary spins occupy a larger ratio than the normal spins, and tend to be easily selected in a case of inversion candidates. Therefore, the selection of the spin state is biased, the search efficiency is deteriorated, and the time to reach the minimum energy becomes long. As described above, the improvement of the process performance for the combinatorial optimization problem is difficult in the case where the range constraint Is present.

Furthermore, in the known technology of stochastically selecting the transition state after adding an offset to an energy change value, the auxiliary spins are introduced in the same manner and the improvement of the process performance for the combinatorial optimization problem is difficult in the case where the range constraint is present.

The disclosed technology has been made in view of the foregoing, and an object is to provide an optimizer, an optimization method, and an optimization program that improve the process performance for the combinatorial optimization problem.

Hereinafter, examples of an optimizer, an optimization method, and an optimization program disclosed herein will be described in detail with reference to the drawings. Note that the following examples do not limit the optimizer, the optimization method, and the optimization program disclosed herein.

First Embodiment

Figure 1:
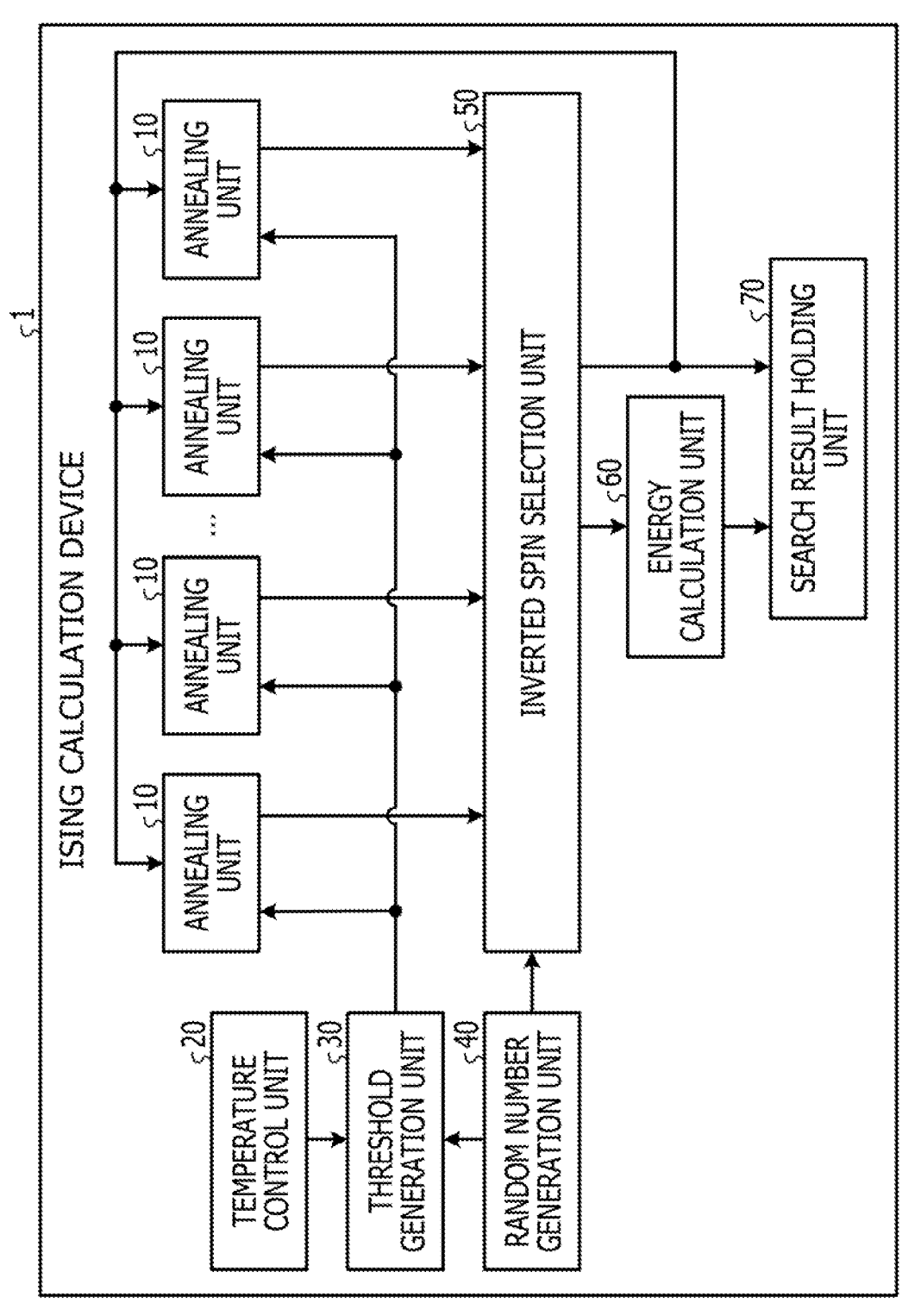
FIG. 1 is a block diagram of an Ising calculation device.

FIG. 1 is a block diagram of an Ising calculation device. An Ising calculation device 1 includes a plurality of annealing units 10, a temperature control unit 20, a threshold generation unit 30, a random number generation unit 40, an inverted spin selection unit 50, an energy calculation unit 60, and a search result holding unit 70. For example, one-thousand and twenty-four annealing units 10 are mounted on the single Ising calculation device 1. "Inversion" in the following description includes a change in a value of an auxiliary spin in addition to a known change in a spin state from 0 to 1 or 1 to 0.

The Ising calculation device 1 according to the present embodiment is an optimizer that searches for a combination $(x_0, x_1, \ldots, x_n)$ of variables $x_i$ that minimizes energy of an Ising model expressed by the formula (1) that is an evaluation function.

[Formula. 6]

$$E = -\sum_n p_n \; x_n + k\left(y_0 - \sum_n w_n x_n\right)^2 \quad (6)$$

Here, E in the formula (6) represents energy. Then, the variable $x_i$ In the formula (6) is a state variable and takes a value of zero or one. Furthermore, the variable $y_0$ is a condition of a range constraint, and can take an arbitrary value in a preset range. Note that the variable $y_0$ is incremented or decremented by one at a time. Moreover, k in the formula (6) is a coefficient of a constraint term.

In the following description, the variable xi is called "spin", and the value of the variable $x_i$ is called "spin state". The spin state is represented as 0 or 1. Furthermore, the variable $y_0$ is called "auxiliary spin". That is, there is one auxiliary spin in this case. Then, since the variable $y_0$ takes an arbitrary value in a predetermined range, the value given to the variable $y_0$ is called spin state for the variable $y_0$ and represented by "M".

Furthermore, hereinafter, transition of the spin state and change in the value of the auxiliary spin are referred to as "inversion". That is, the inversion corresponds to transition of the spin state from 0 to 1, transition of the spin state from 1 to 0, change in the value of $y_0$ from M to M+1, or a change in the value of $y_0$ from M to M−1.

The formula (6) can be transformed as Illustrated in the transformation 11 in FIG. 2. FIG. 2 is a diagram illustrating a calculation example regarding auxiliary spins according to the first embodiment. A difference in the case of increasing the value of $y_0$ from M to M+1 and a difference in a case of decreasing the value of $y_0$ from M to M−1 from the transformed formula of the transformation 11 are expressed by the Equation 12. That is, an energy change amount in the case of increasing or decreasing the value of the auxiliary spin in this case is expressed by the following formula (7).

[Formula. 7]

$$\Delta E(y_0 = M \to M \pm 1) = k \mp \left(-2kM + 2k\sum_n w_n x_n\right) \quad (7)$$

Moreover, a local field in the auxiliary spin is expressed by the following formula (8).

[Formula. 8]

$$h(y_0) = -2kM + 2k\sum_n w_n x_n \quad (8)$$

Furthermore, a change amount in the local field in the auxiliary spin when spin inversion occurs is expressed by the following formula (9).

[Formula. 9]

$$\delta h(y_0) = \begin{cases} -2k \;\; (\text{for } y_0 = M \to M + 1) \;\; (9) \\ +2k \;\; (\text{for } y_0 = M \to M - 1) \\ +2kw_n \;\; (\text{for } x_n = 0 \to 1) \\ -2kw_n \;\; (\text{for } x_n = 1 \to 0) \end{cases}$$

The formula (9) expresses, from the top, the change amount in the local field in the case where the auxiliary spin increases by 1, the change amount in the local field in the case where the auxiliary spin decreases by 1, the change amount in the local field in the case where the spin state changes from 0 to 1, and the change amount in the local field in the case where the spin state changes from 1 to 0.

Here, a case where a value of an interaction coefficient $W_{ij}$ with respect to the auxiliary spin is expressed by the following formula (10) will be described.

[Formula. 10]

$$W_{ij}(y_0) = \begin{cases} 2kw_j(i \neq j) \;\; (10) \\ -2k(i = j) \end{cases}$$

In this case, the energy change amount in the case where the spin state changes in addition to the normal spin and the auxiliary spin are expressed by the following formula (11). The coefficient k of the constraint term in the formula (11) is set to "0" In the case of the normal spin.

[Formula. 11]

$$\Delta E_i = \begin{cases} k - h_i \;\; (\text{for addition or } x_j = 0 \to 1) \;\;\; (11) \\ k + h_i \;\; (\text{for subtraction or } x_j = 1 \to 0) \end{cases}$$

Moreover, the change amount in the value of the local field in that case is expressed by the following formula (12).

[Formula. 12]

$$h_i = \begin{cases} +W_{ij} & \text{(for addition or } x_j = 0 \to 1) \\ -W_j & \text{(for subtraction or } x_j = 1 \to 0) \end{cases} \quad (12)$$

Here, in the evaluation function according to the present embodiment, the change amount in the auxiliary bit changes by one at a time. Therefore, the auxiliary bit is set to be able to take multiple values but calculation of the value of the auxiliary bit in each operation is addition or subtraction of 1, and the calculation of the auxiliary bit does not become large. Then, regarding the value of the auxiliary bit, it is possible to cover the range of values that can be taken by the auxiliary bit by determining whether it is energetically advantageous when changing the value, and selecting the value of the auxiliary bit.

In the present embodiment, a case of using a lower limit value of the range constraint represented by the auxiliary spin $y_0$ as an initial value of the constraint term will be described.

The temperature control unit 20 shown in FIG. 1 is a circuit that controls a value of a temperature parameter. The temperature parameter is a temperature value used to control the temperature. Hereinafter, there are some cases where the temperature parameter is represented as T.

The temperature control unit 20 lowers the temperature by gradually decreasing the value of the temperature parameter according to the number of iterations of the search, starting from a sufficiently high initial temperature, according to a simulated annealing method, for example. Starting from an initial state, the iteration is repeated while lowering the temperature by the temperature control unit 20. When a termination determination condition such as achievement of a certain number of iterations or a value of energy falling below a certain value is satisfied, the operation is terminated. In addition, the temperature control unit 20 can use a replica exchange method for searching for the minimum energy while switching a low temperature condition and a high temperature condition by executing several systems called replicas having different temperature conditions in parallel and exchanging the systems for each of the predetermined number of iterations.

The random number generation unit 40 is a circuit that generates a random number value. The random number generation unit 40 outputs the generated random number to the threshold generation unit 30 and the inverted spin selection unit 50.

The threshold generation unit 30 is a circuit that generates a threshold used for determining whether or not each spin becomes an inversion candidate. The threshold generation unit 30 acquires the temperature parameter from the temperature control unit 20. Furthermore, the threshold generation unit 30 acquires the random number value from the random number generation unit 40.

Here, in the present embodiment, inversion of the variables is adopted according to the following formula (13). For example, the inversion of the variables is adopted with $e^{-\Delta A/T}$ or 1, whichever is smaller, as an adoption probability.

[Formula. 13]

$$P = \min\left[1, e^{-\frac{\Delta E}{T}}\right] \quad (13)$$

In the present embodiment, the inverted spin is stochastically adopted according to the formula (13) according to the random number generated by the random number generation unit 40. In this case, the condition that the adoption probability is according to the formula (13) is the same as that the inversion is adopted in a case where the following formula (14) is satisfied using a uniform random number r.

[Formula. 14]

$$\Delta E < T \times \log\frac{1}{r} \quad (14)$$

The formula (14) is a formula for determining whether or not to adopt the inversion, and may be referred to as "inversion determination formula" below.

Therefore, the threshold generation unit 30 generates a value of a right side of the formula (14), using the temperature parameter and the random number value. Then, the threshold generation unit 30 outputs the generated value of the right side of the formula (14) to the annealing unit 10.

Figure 3:
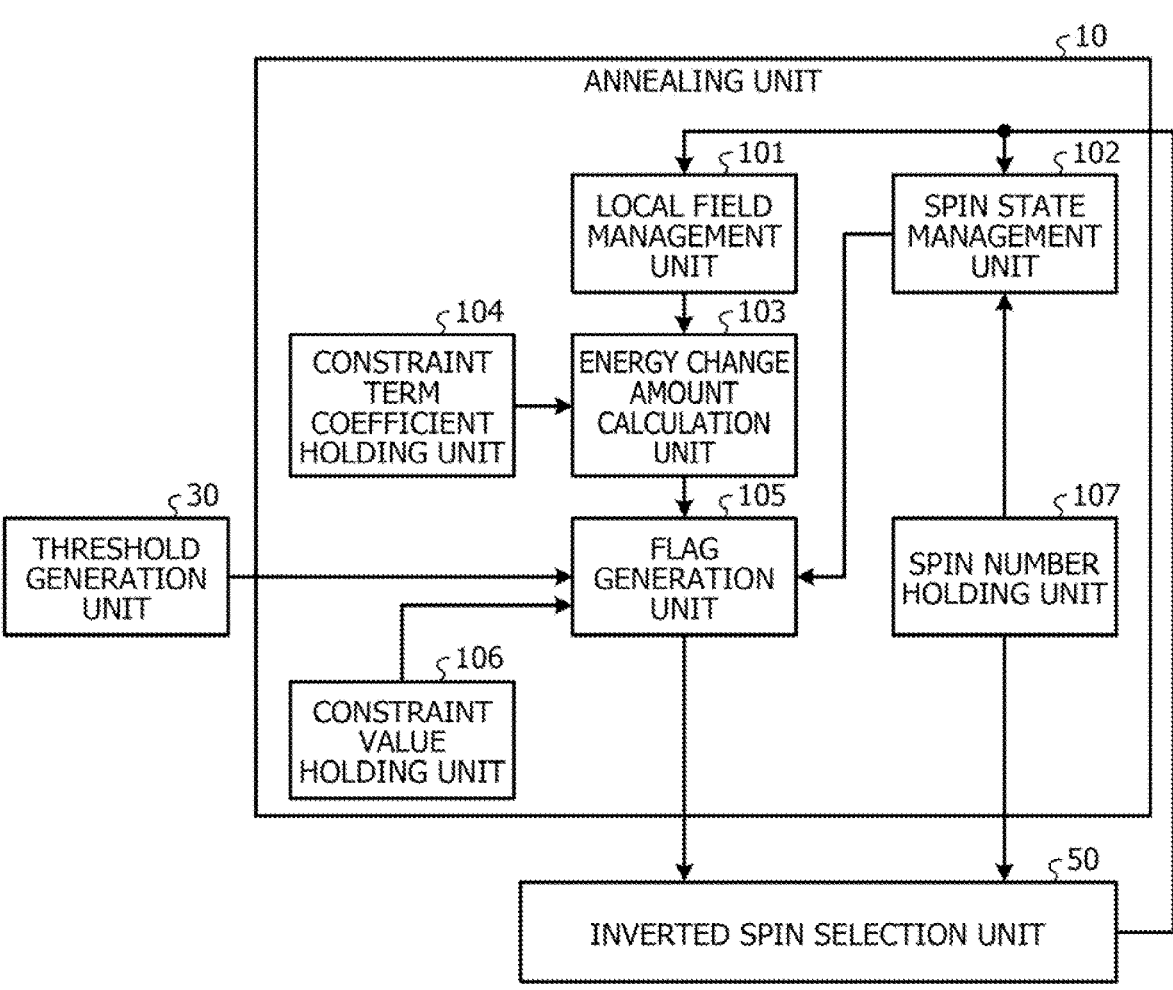
FIG. 3 is a block diagram illustrating details of an annealing unit.

The annealing unit 10 holds the spin state and the local field for one spin of the spin or the auxiliary spin. Hereinafter, the spin or the auxiliary spin to be controlled by each annealing unit 10 is referred to as own spin. Then, the annealing unit 10 is a circuit that determines whether or not the own spin becomes the inversion candidate on the basis of the energy change amount when the own spin is inverted. Details of the annealing unit 10 will be described below with reference to FIG. 2. FIG. 3 is a block diagram illustrating details of the annealing unit. As illustrated in FIG. 1, the plurality of annealing units 10 exists. Then, the respective annealing units 10 control different spins but execute the same process. Therefore, a specific annealing unit 10 will be described below.

As illustrated in FIG. 3, the annealing unit 10 includes a local field management unit 101, a spin state management unit 102, an energy change amount calculation unit 103, a constraint term coefficient holding unit 104, a flag generation unit 105, a constraint value holding unit 106, and a spin number holding unit 107.

The spin number holding unit 107 holds a spin number for identifying the own spin. For example, the spin number corresponds to a number for Identifying i or the auxiliary spin $y_0$ in the case where the spin is represented as $x_i$. If the annealing unit 10 has the own spin that is a spin $x_i$, the spin number holding unit 107 holds i as a spin number used to identify the spin $x_i$. Furthermore, in the case of the annealing unit 10 in which the own spin is the auxiliary spin $y_0$, the spin number holding unit 107 holds i as the spin number for identifying the auxiliary spin $y_0$. Then, the spin number holding unit 107 outputs the held spin number to the spin state management unit 102 and the inverted spin selection unit 50.

The spin state management unit 102 holds the current spin state of the own spin and manages the spin state of the own spin. For example, the spin state management unit 102 receives setting of an initial value of the spin state of the own spin when an optimum solution search process is started. For example, in a case where the initial values of $x_i$ are all 0, the spin state management unit 102 of the annealing unit 10 in which the own spin is the spin $x_i$ acquires the value of 0 as the initial value. Furthermore, since the initial value of the constraint term is 0 in the present embodiment, the spin state management unit 102 of the annealing unit 10 in which the own spin is the auxiliary spin $y_0$ acquires the value of 0 as the initial value.

FIG. 4 is a diagram illustrating an example of a file for an initial setting instruction. In the present embodiment, the initial values of the spin states of the respective spins are all 0, so the spin states in file 13 are all set to 0. When the Ising calculation device 1 reads the file 13, each spin state registered in the file 13 is set in each spin state management unit 102.

Furthermore, the spin state management unit 102 acquires the spin number from the spin number holding unit 107. Then, the spin state management unit 102 outputs the spin state together with the spin number to the flag generation unit 105.

Thereafter, in the case where the inversion is adopted by the inverted spin selection unit 50, the spin state management unit 102 receives an inverted spin determination notification together with the spin number of the inverted spin from the inverted spin selection unit 50. Furthermore, the spin state management unit 102 receives an input of either an addition flag representing inversion of adding 1 to the spin or a subtraction flag representing inversion of subtracting 1 from the auxiliary spin from the inverted spin selection unit 50. Then, the spin state management unit 102 executes the following process in the case where the inverted spin is the own spin. The spin state management unit 102 updates the held value with a value obtained by adding 1 to the current spin value as a new spin value in the case of the addition flag. Furthermore, the spin state management unit 102 updates the held value with a value obtained by subtracting 1 from the current spin value as a new spin value in the case of the subtraction flag.

The local field management unit 101 holds information regarding a current local field and manages a local field corresponding to the own spin. Here, since the energy change amount in the case where the own spin is inverted can be calculated from the formula (11) on the basis of the local field and the spin state, the local field management unit 101 holds the information regarding the local field for each annealing unit 10 for allowing the annealing unit 10 to calculate the energy change amount. Then, the local field management unit 101 outputs the held local field to the energy change amount calculation unit 103.

More specifically, the local field management unit 101 receives setting of an initial value of the local field with respect to the own spin when the optimum solution search process is started. For example, when the Ising calculation device 1 reads the file 13 of FIG. 4, the local field of each spin registered in the file 13 is set in the local field management unit 101. In addition, the local field management unit 101 may calculate the initial value of the local field with respect to the own spin by receiving an input of the initial value of each spin.

After that, when the inversion is adopted by the inverted spin selection unit 50 and the inverted spin is determined, the local field management unit 101 receives the inverted spin determination notification together with the spin number of the inverted spin from the inverted spin selection unit 50. Next, the local field management unit 101 calculates a change amount of the local field, using the spin number of the inverted spin of which the inversion is determined in the formula (12). Then, the local field management unit 101 calculates the local field with respect to the own spin, using the calculated change amount of the local field for the held information regarding the local field. Thereafter, the local field management unit 101 updates the held information regarding the local field with Information regarding the calculated local field as Information regarding the current local field.

The constraint term coefficient holding unit 104 is, for example, a register. Then, the constraint term coefficient holding unit 104 holds a predetermined value of the coefficient of the constraint term corresponding to k in the formula (6). For example, when the Ising calculation device 1 reads the file 13 of FIG. 4, the constraint term coefficient holding unit 104 stores a constraint term coefficient of each spin registered in the file 13. As illustrated in the file 13, 0 is set as the constraint term coefficient for the normal spin $x_i$, and a predetermined value is set as the constraint term coefficient for the auxiliary spin $y_0$. In the case of using the file 13, the constraint term coefficient for the auxiliary spin $y_0$ is set to 100.

The energy change amount calculation unit 103 receives an input of the information regarding the local field from the local field management unit 101. Furthermore, the energy change amount calculation unit 103 acquires the coefficient of the constraint term corresponding to k in the formula (6) from the constraint term coefficient holding unit 104. Then, the energy change amount calculation unit 103 calculates the energy change amount by the Inversion of the own spin, using the formula (11). After that, the energy change amount calculation unit 103 outputs the calculated energy change amount by the inversion of the own spin to the flag generation unit 105.

The constraint value holding unit 106 is, for example, a register. Then, the constraint value holding unit 106 holds an upper limit value and a lower limit value in the range constraint. In the case where the own spin is the normal spin, the upper limit value is set to 1 and the lower limit value is set to 0, so that the spin state falls within the range of the range constraint. For example, when the Ising calculation device 1 reads the file 13 of FIG. 4, the constraint value holding unit 106 stores the upper limit value and the lower limit value for each spin registered in the file 13. As illustrated in the file 13, 1 is set as the upper limit value and 0 is set as the lower limit value for the normal spin $x_i$. Further, in the file 13, predetermined values are set as the upper limit value and the lower limit value for the auxiliary spin $y_0$. In the case of using the file 13, the upper limit value for the auxiliary spin $y_0$ is set to 190, and the lower limit value for the auxiliary spin $y_0$ is set to 0. This is a setting for solving the knapsack problem when packing items in the knapsack having the maximum capacity of 190, for example.

The flag generation unit 105 receives an input of the spin state from the spin state management unit 102. Furthermore, the flag generation unit 105 acquires the upper limit value and the lower limit value in the range constraint from the constraint value holding unit 106. Furthermore, the flag generation unit 105 receives an input of the energy change amount from the energy change amount calculation unit 103. Moreover, the flag generation unit 105 receives an input of the value of the right side of the Inversion determination formula expressed by the formula (14) from the threshold generation unit 30.

Next, the flag generation unit 105 determines whether or not the spin state after inversion is within the range of the upper limit value and the lower limit value. Then, the flag generation unit 105 determines that addition candidate determination is not possible in a case where the spin state matches the upper limit value, and determines that the addition candidate determination is possible in a case where the spin state is less than the upper limit value. Furthermore, the flag generation unit 105 determines that subtraction candidate determination is not possible in a case where the spin state matches the lower limit value, and determines that the subtraction candidate determination is possible in a case where the spin state exceeds the lower limit value.

Next, in a case where either one of or both of the addition candidate determination and the subtraction candidate determination are possible, the flag generation unit 105 determines whether or not the energy change amount satisfies the inversion determination formula where the right side of the formula (14) is set to the value obtained from the threshold generation unit 30.

In a case where the energy change amount satisfies the inversion determination formula, the flag generation unit 105 generates an inversion candidate flag indicating that the own spin is an inversion candidate. On the other hand, in a case where the energy change amount does not satisfy the inversion determination formula, the flag generation unit 105 generates an inversion candidate flag indicating that the own spin is not the inversion candidate. For example, the flag generation unit 105 sets the value of F to 1 in the case where the inversion candidate flag indicates that the own spin is the inversion candidate, and sets the value of F to 0 in the case where the inversion candidate flag indicates that the own spin is not the inversion candidate, where the inversion candidate flag is F.

Next, in the case where the own spin is the auxiliary spin, the flag generation unit 105 can transition to the spin state where 1 is added to the value of the current auxiliary spin $y_0$, and to the spin state where 1 is subtracted from the value of the current auxiliary spin $y_0$. In the case where transitions to two spin states are available, the flag generation unit 105 selects the spin state of the case of addition as the candidate when the addition candidate determination is possible and the subtraction candidate determination is not possible. On the contrary, the flag generation unit 105 selects the spin state of the case of subtraction as the candidate when the addition candidate determination is not possible and the subtraction candidate determination is possible. Furthermore, the flag generation unit 105 selects either one of the spin states in the case where both the addition candidate determination and the subtraction candidate determination are possible. Then, the flag generation unit 105 generates the addition flag in the case of selecting the transition to the spin state of the case of addition. Furthermore, the flag generation unit 105 generates the subtraction flag in the case of selecting the transition to the spin state of the case of subtraction.

Thereafter, the flag generation unit 105 outputs the generated inversion candidate flag, and the addition flag or the subtraction flag, if any, to the inverted spin selection unit 50. Hereinafter, the Inversion candidate flag, the addition flag, and the subtraction flag may be collectively referred to as flag(s).

Returning to FIG. 1, the description will be continued. The inverted spin selection unit 50 acquires the spin number of the own spin in each annealing unit 10 from the spin number holding unit 107 of each annealing unit 10. Furthermore, the inverted spin selection unit 50 receives an input of the own spin in each annealing unit 10. Furthermore, the inverted spin selection unit 50 receives an input of a random number from the random number generation unit 40.

Then, the inverted spin selection unit 50 confirms the inversion candidate flag acquired from each annealing unit 10 and determines whether or not there is an inversion candidate spin that is a spin having the inversion candidate flag representing that the spin becomes the inversion candidate.

In the case where the inversion candidate spin is present, the inverted spin selection unit 50 selects one inversion candidate spin from among inversion candidate spins acquired according to the acquired random number from the random number generation unit 40.

Then, the inverted spin selection unit 50 determines the selected inversion candidate spin as the inverted spin. Thereafter, the inverted spin selection unit 50 outputs the spin number and the spin state of the inverted spin together with the inverted spin determination notification to the energy calculation unit 60 and the search result holding unit 70. The inverted spin selection unit 50 outputs the spin number of the inverted spin together with the inverted spin determination notification to the annealing unit 10. At this time, in the case of including the addition flag or the subtraction flag, the inverted spin selection unit 50 outputs the included addition flag or subtraction flag to the annealing unit 10.

For example, the energy calculation unit 60 preliminarily includes the initial values of the respective spins where all the spin states are 0. Then, the energy calculation unit 60 obtains the energy, using the initial value of each spin in the formula (6) and holds the obtained energy.

Thereafter, the energy calculation unit 60 receives inputs of the spin number and the spin state of the inverted spin together with the inverted spin determination notification from the inverted spin selection unit 50. Next, the energy calculation unit 60 inverts the spin state of the spin having the spin number notified from the inverted spin selection unit 50 in the spin state of each spin held in the energy calculation unit 60 and generates the spin state of each new spin. Furthermore, the energy calculation unit 60 acquires the energy change amount in the case where the spin state of the inverted spin is inverted from the inverted spin selection unit 50. Then, the energy calculation unit 60 adds the acquired energy change amount to the held energy value to calculate the energy of the case where the spin state of the inverted spin is inverted.

Thereafter, the energy calculation unit 60 holds the spin state of each spin in the state where the spin state of the inverted spin is inverted. Moreover, the energy calculation unit 60 outputs the calculated energy in the state where the spin state of the inverted spin is inverted to the search result holding unit 70.

The search result holding unit 70 receives an input of information of the calculated energy from the energy calculation unit 60. Moreover, the search result holding unit 70 receives the inputs of the spin number and the spin state of the inverted spin from the inverted spin selection unit 50. Then, in a case where minimum energy is not held, the search result holding unit 70 sets the acquired energy as the minimum energy. In this case, the search result holding unit 70 holds the spin state of each spin in the case of the minimum energy.

On the other hand, in a case where the minimum energy has been already held, the search result holding unit 70 compares the acquired energy with the holding minimum energy. In a case where the acquired energy is less than the minimum energy, the search result holding unit 70 sets the acquired energy as the minimum energy. Moreover, the search result holding unit 70 holds the spin state of each spin in the case of the acquired energy. Meanwhile, in a case where the acquired energy is equal to or more than the minimum energy, the search result holding unit 70 continues to hold the held minimum energy and the spin state of each spin as they are. However, initial energy may be set as the initial value of the minimum energy. In that case, the state where the search result holding unit 70 does not hold the minimum energy is not present, and the process starts from the case where the search result holding unit 70 already holds the minimum energy. The search result holding unit 70 corresponds to an example of a "search unit".

Figure 5A:
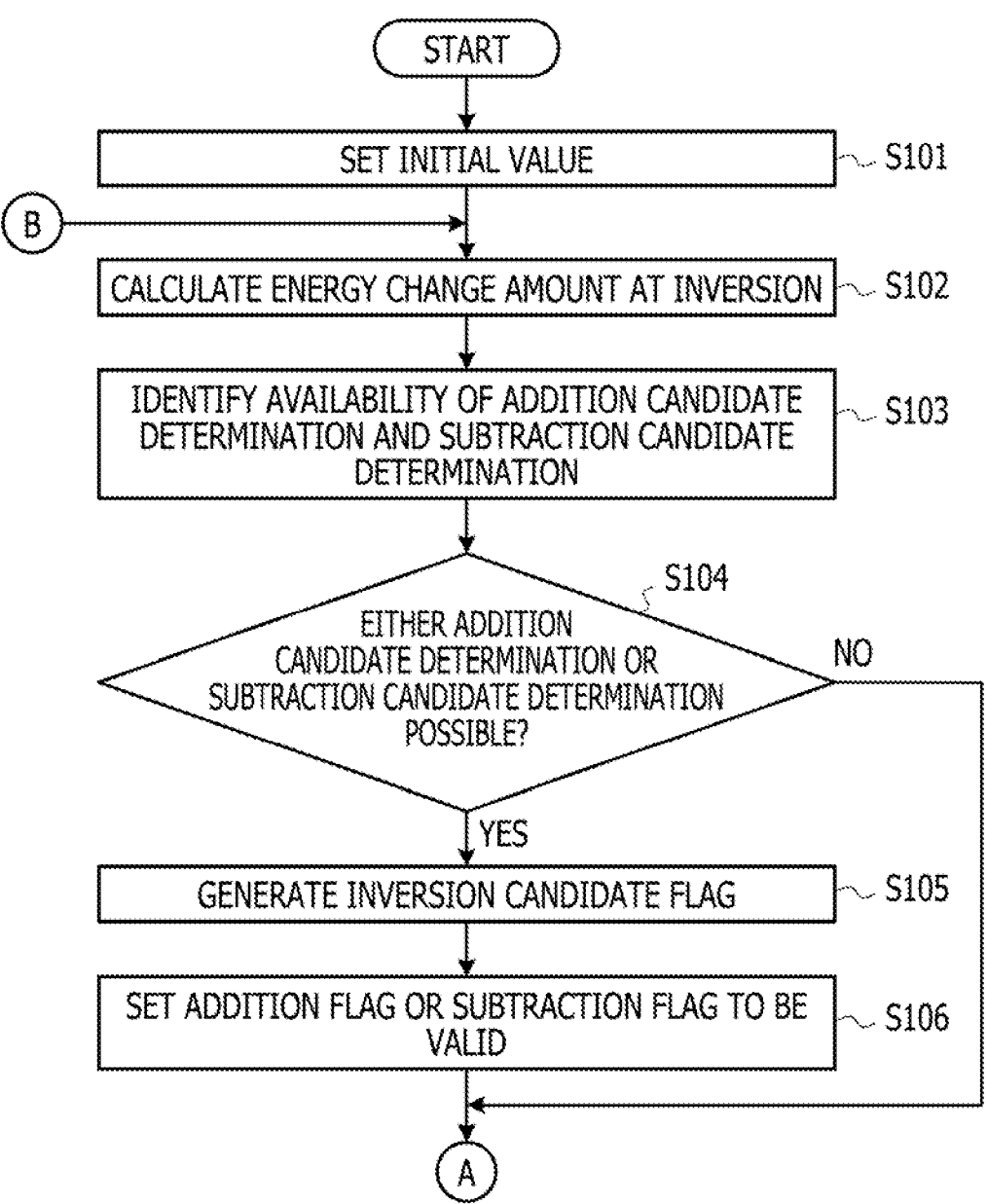
FIG. 5A is a flowchart of an optimum solution search process by an Ising calculation device according to the first embodiment.
Figure 5B:
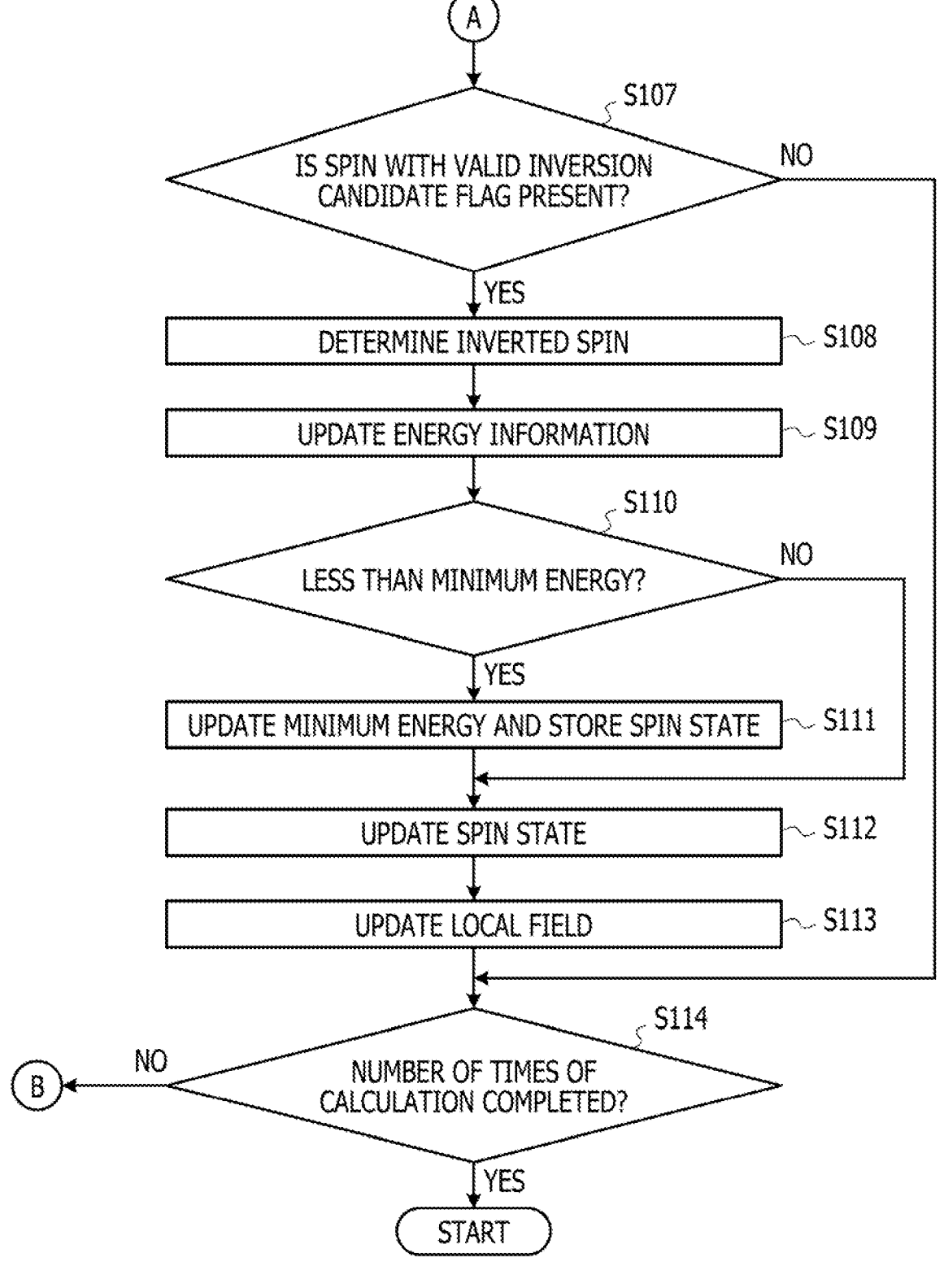

Next, a flow of the optimum solution search process by the Ising calculation device 1 according to the present embodiment will be described with reference to FIGS. 5A and 5B. FIGS. 5A and 5 are flowcharts of the optimum solution search process by the Ising calculation device according to the first embodiment.

The Ising calculation device 1 sets the initial value in each unit on the basis of, for example, the input file from an operator using an external terminal (not illustrated) or the like (step S101). For example, the spin state management unit 102 of the annealing unit 10 sets the initial value of the spin state of the own spin. Furthermore, the spin number holding unit 107 sets the spin number of the own spin. Furthermore, the local field management unit 101 sets the initial value of the local field for the own spin. Furthermore, the value of the constraint term coefficient is set in the constraint term coefficient holding unit 104. Furthermore, the upper limit value and the lower limit value are set in the constraint value holding unit 106.

Next, the energy change amount calculation unit 103 of the annealing unit 10 acquires the information regarding the local field held by the local field management unit 101. Furthermore, the energy change amount calculation unit 103 acquires the value of the constraint term coefficient to be used in the own spin from the constraint term coefficient holding unit 104. Then, the energy change amount calculation unit 103 calculates the energy change amount, at the time when the own spin is inverted, using the formula (11) (step S102). Here, the energy change amount calculation unit 103 calculates both the energy change amount in the case of addition and the energy change amount in the case of subtraction in the case where the state transition in the case of addition and the state transition in the case of subtraction are present. Thereafter, the energy change amount calculation unit 103 outputs the calculated energy change amount at the time of inversion of the own spin to the flag generation unit 105.

The flag generation unit 105 identifies availability of each of the addition candidate determination and the subtraction candidate determination (step S103).

Next, the flag generation unit 105 determines whether either the addition candidate determination or the subtraction candidate determination is possible (step S104). In the case where both the addition candidate determination and the subtraction candidate determination are not possible (step S104: negative), the optimum solution search process proceeds to step S107. Note that steps S102 to S106 are performed in parallel in each annealing unit 10, and all the results are input to the inverted spin selection unit 50. That is, there may be different processes such as a certain annealing unit 10 obtaining the negative determination in step S104 and proceeding to step S107, whereas another annealing unit 10 obtaining the affirmative determination in step S104 and proceeding to step S107 through steps S105 and S106.

Meanwhile, in the case where either the addition candidate determination or the subtraction candidate determination is possible (step S104: affirmative), the flag generation unit 105 generates the inversion candidate flag according to a comparison result between the energy change amount and the threshold input from the threshold generation unit 30 (step S105). Specifically, in the case where the energy change amount satisfies the inversion determination formula in which the threshold is substituted, the flag generation unit 105 generates the Inversion candidate flag representing that each spin becomes the inversion candidate. On the contrary, in the case where the energy change amount does not satisfy the inversion determination formula in which the threshold is substituted, the flag generation unit 105 generates the Inversion candidate flag representing not the inversion candidate.

Moreover, the flag generation unit 105 sets either the addition flag or the subtraction flag to be valid (step S106). Specifically, the flag generation unit 105 sets the addition flag to be valid in the case where the addition candidate determination is possible, or sets the subtraction flag to be valid in the case where the subtraction candidate determination is possible. Furthermore, in the case where both the addition candidate determination and the subtraction candidate determination are possible, the flag generation unit 105 selects either the addition flag or the subtraction flag and sets the selected flag to be valid. Thereafter, the flag generation unit 105 outputs the generated flag to the inverted spin selection unit 50.

The inverted spin selection unit 50 receives an input of the spin number of the inversion candidate spin from the spin number holding unit 107. Furthermore, the inverted spin selection unit 50 receives an input of the flag from the flag generation unit 105. Then, the inverted spin selection unit 50 determines whether or not a spin with the valid inversion candidate flag is present (step S107). In a case where the spin with the valid inversion candidate flag is not present (step S107: negative), the optimum solution search process proceeds to step S114.

Meanwhile, in a case where the spin with the valid inversion candidate flag is present (step S107: affirmative), the inverted spin selection unit 50 selects the spin according to the random number input from the random number generation unit 40 from among the spins with the valid inversion candidate flag and determines the inverted spin (step S108). Thereafter, the inverted spin selection unit 50 outputs the inverted spin determination notification together with the spin number to the annealing unit 10, the energy calculation unit 60, and the search result holding unit 70. Furthermore, in the case where either the addition flag or the subtraction flag is valid, the inverted spin selection unit 50 outputs the valid addition flag or subtraction flag to the annealing unit 10.

When receiving the inverted spin determination notification, the energy calculation unit 60 inverts the spin state of the spin having the spin number acquired from the inverted spin selection unit 50 in the spin state of each held spin. Furthermore, the energy calculation unit 60 acquires the energy change amount in the case where the spin state of the inverted spin is inverted from the inverted spin selection unit 50. Then, the energy calculation unit 60 adds the acquired energy change amount to the held energy value to calculate the energy of the case where the spin state of the inverted spin is inverted. Thereafter, the energy calculation unit 60 updates the spin state of each spin and the held information regarding energy (step S109).

Thereafter, the energy calculation unit 60 outputs the calculated energy to the search result holding unit 70. The search result holding unit 70 determines whether or not the energy acquired from the energy calculation unit 60 is less than the holding minimum energy (step S110). In a case where the energy acquired from the energy calculation unit 60 is equal to or larger than the held minimum energy (step S110: negative), the optimum solution search process proceeds to step S112.

Meanwhile, in a case where the energy acquired from the energy calculation unit 60 is less than the held minimum energy (step S110: affirmative), the search result holding unit 70 updates the held minimum energy with the energy acquired from the energy calculation unit 60 as the minimum energy. Moreover, the search result holding unit 70 stores the spin state of each spin in which the spin state of the inverted spin is inverted in the spin state of each held spin as the spin state of the new minimum energy (step S111).

The annealing unit 10 receives an input of the determination of the inverted spin together with the spin number of the inverted spin from the inverted spin selection unit 50. In the case where the Inverted spin in which inversion is determined is the own spin, the spin state management unit 102 updates the spin state of the own spin (step S112). Here, in the case where the addition flag or the subtraction flag is added, the spin state management unit 102 updates the value of the spin according to the addition flag or the subtraction flag to update the spin state.

The local field management unit 101 calculates the change amount of the local field, using the spin number of the inverted spin of which the inversion is determined in the formula (12). Here, in the case where the addition flag or the subtraction flag is added, the local field management unit 101 calculates the change amount of the local field, using the interaction coefficient, according to the addition flag or the subtraction flag. Then, the local field management unit 101 calculates the local field with respect to the own spin, using the calculated change amount of the local field for the held information regarding the local field. Thereafter, the local field management unit 101 updates the held information regarding the local field with information of the calculated local field as information of the current local field (step S113).

Thereafter, the search result holding unit 70 determines whether or not a predetermined number of times of calculation is completed (step S114). In a case where the predetermined number of times of calculation is not completed (step S114: negative), the optimum solution search process returns to step S102. On the other hand, in a case where the predetermined number of times of calculation is completed (step S114: affirmative), the search result holding unit 70 determines the spin state with the minimum energy at that time as the optimum solution and terminates the optimum solution search process.

Figure 6:
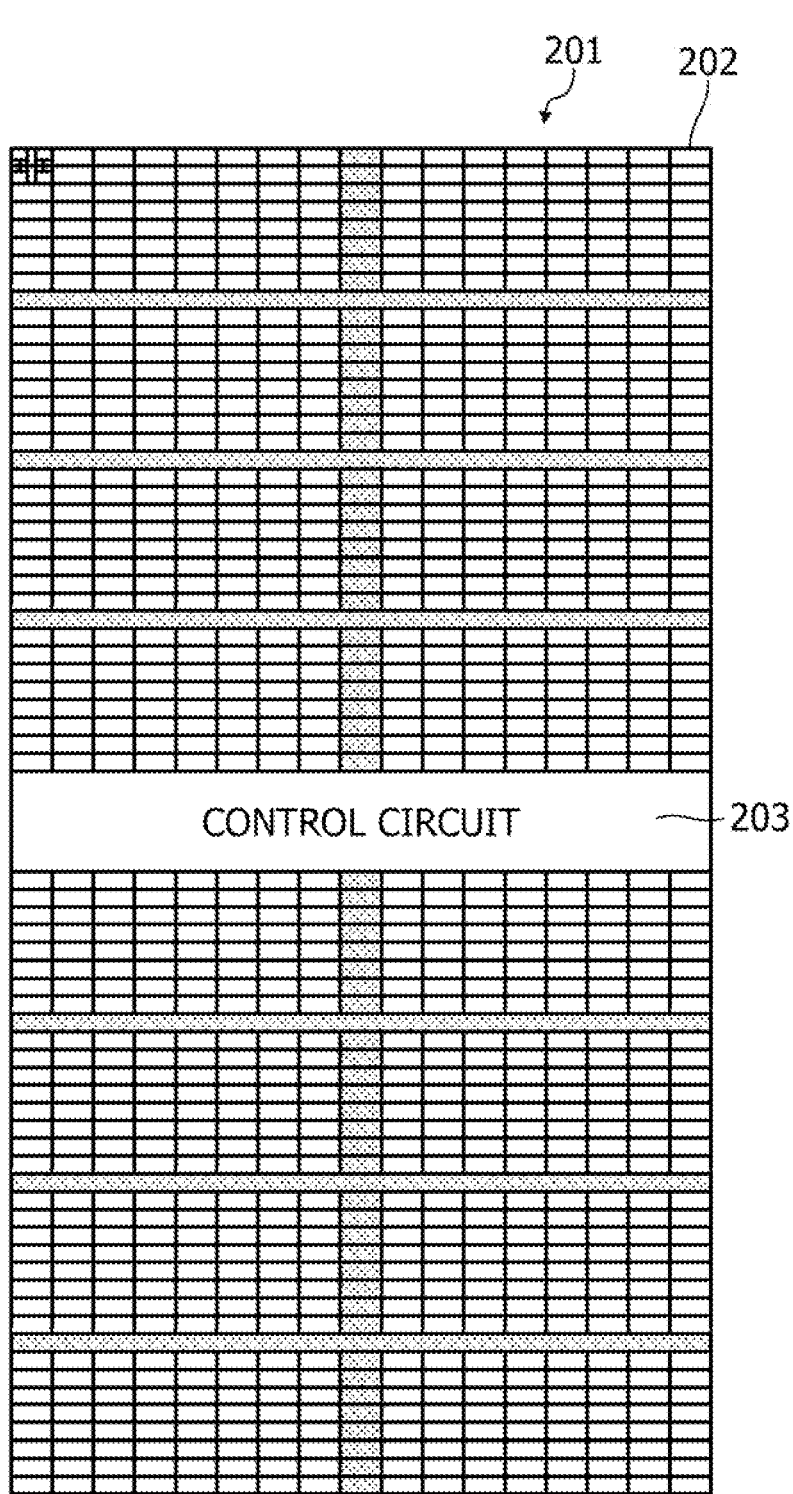
FIG. 6 is an arrangement configuration diagram of the Ising calculation device.

FIG. 6 is an arrangement configuration diagram of the Ising calculation device. The Ising calculation device 1 according to the present embodiment corresponds to an annealing circuit 201 in FIG. 6. The annealing circuit 201 is a functional unit capable of executing annealing. Each annealing circuit 201 includes a plurality of unit circuits 202 and a control circuit 203. For example, one-thousand and twenty-four unit circuits 202 are mounted on the single annealing circuit 201. The unit circuit 202 is a unit of logic and implementation for single spin determination or state management and corresponds to the annealing unit 10 and the inverted spin selection unit 50. Furthermore, the control circuit 203 is a circuit that controls the annealing circuit 201 and corresponds to the energy calculation unit 60, the search result holding unit 70, and the like. That is, when a flag is generated in the unit circuit 202 and the inverted spin is determined thereafter, the spin state and the local field are updated in the unit circuit 202.

Figure 7:
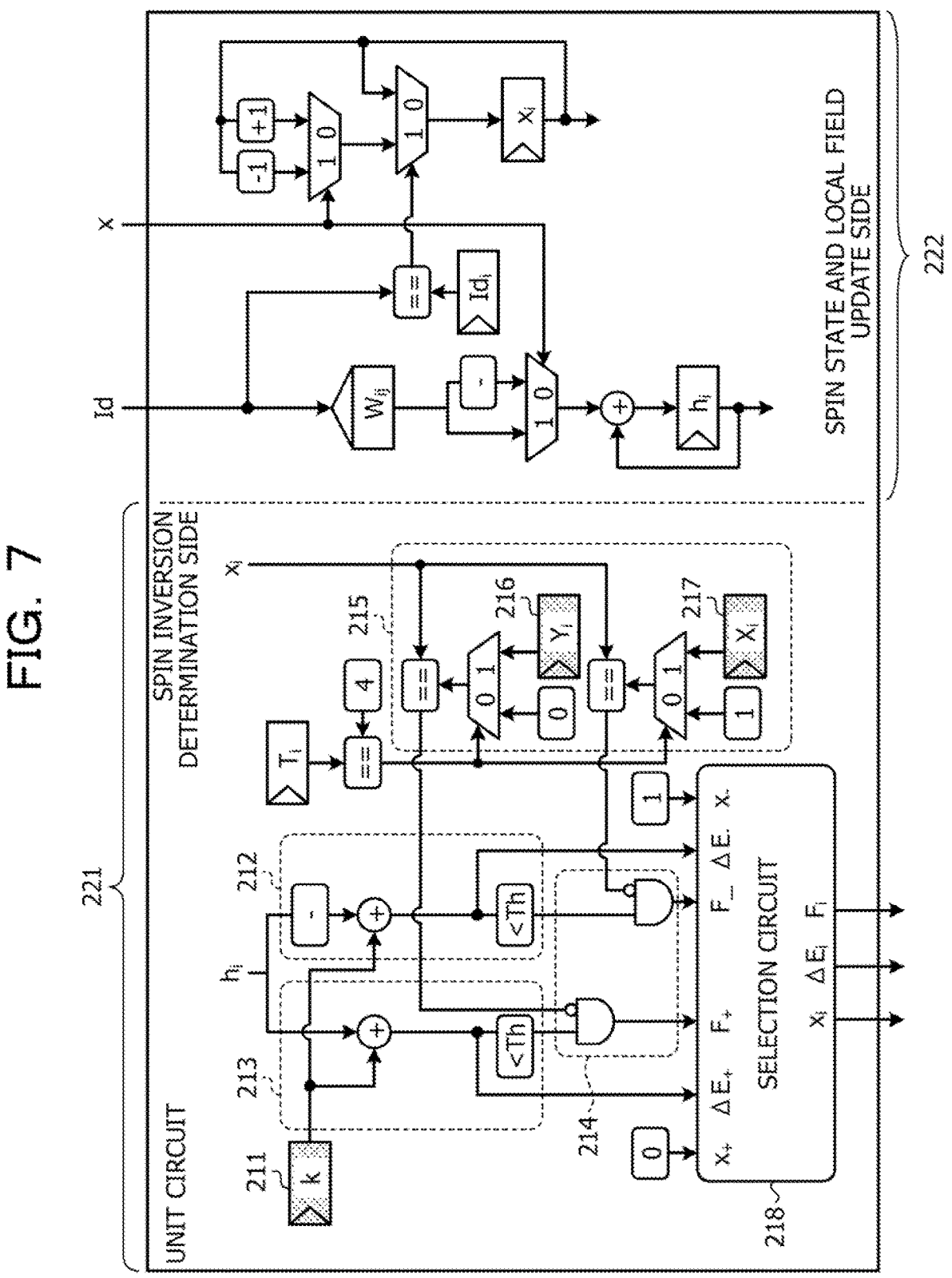
FIG. 7 is a diagram of a circuit image of a unit circuit.

Furthermore, FIG. 7 is a diagram of a circuit image of the unit circuit. A register 211 illustrated in FIG. 7 corresponds to an example of the constraint term coefficient holding unit 104, and registers 216 and 217 correspond to examples of the constraint value holding unit 106. Furthermore, parts other than the registers 216 and 217 in the circuits 212 to 215 and 218 correspond to the energy change amount calculation unit 103 and the flag generation unit 105.

The circuits in a region 221 of the unit circuit 202 are circuits on the spin inversion determination side. The circuit 212 obtains the local field of the case of subtracting the value of the auxiliary spin or the case where the spin state of the normal spin transitions from 1 to 0, and generates the inversion candidate flag using the inversion determination formula. Furthermore, the circuit 213 obtains the local field of the case of adding the value of the auxiliary spin or the case where the spin state of the normal spin transitions from 0 to 1, and generates the inversion candidate flag using the inversion determination formula. The circuit 215 determines whether the spin state after inversion is equal to or smaller than the upper limit value, and equal to or larger than the lower limit value, and identifies the availability of the addition candidate determination and the availability of the subtraction candidate determination. Then, the circuit 215 generates the addition flag and the subtraction flag. The circuit 214 masks the spin state of the spin to which the inversion candidate flag is set not to exceed the constraint range, the Inversion candidate flag representing that the spin becomes the inversion candidate according to the valid/invalid addition flag and the valid/invalid subtraction flag. Thereafter, in the case where both the inversion candidate flag on the addition side and the inversion candidate flag on the subtraction side are present, the circuit 218 selects and outputs either one of them. Internally in the unit circuit 202, when the own spin is the auxiliary spin, the spin state takes multiple values but participates in a tournament with a value of 0 or 1. In this case, the value at the time of participating in the tournament is determined to represent, for example, 0 for addition and 1 for subtraction. Thereafter, the inverted spin selection unit 50 determines the inverted spin by the tournament using a signal output from the circuit 218.

Furthermore, the circuit in a region 222 of the unit circuit 202 is a circuit of the spin state and the local field update side. The circuit in the region 222 is the circuit of the spin state and the local field update side, and updates the spin state and the local field, using the information of the determined inverted spin input from the inverted spin selection unit 50. The circuit in the region 222 corresponds to an example of the local field management unit 101 and the spin state management unit 102. The local field and the spin state output from the circuit in the region 222 are input to the circuits in the region 221 and used for the calculation at the next inversion.

Figure 8:
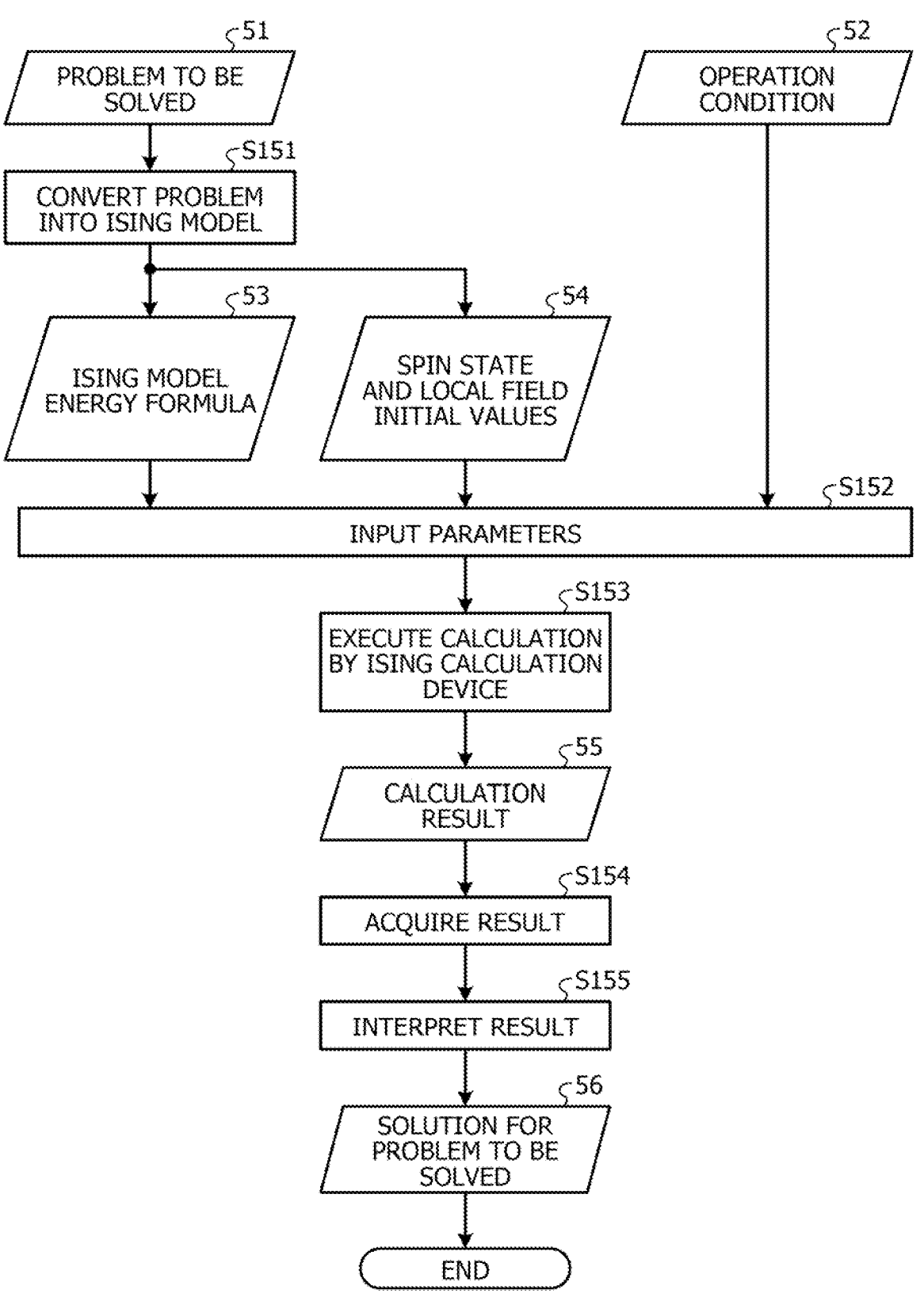
FIG. 8 is a flowchart of a process when using the Ising calculation device.

FIG. 8 is a flowchart of a process when using the Ising calculation device. Here, a user who uses the Ising calculation device 1 is referred to as a user. An overall flow of use of the Ising calculation device 1 by the user will be described with reference to FIG. 8.

There is a problem to be solved 51 that the user desires to solve. The user converts the problem to be solved into the Ising model using a computer or the like (step S151). With this conversion, an Ising model energy formula 53 expressed by the formula (1) is acquired. Moreover, initial values 54 of the spin state and the local field are acquired.

Next, the Ising model energy formula 53, the Initial values 54 of the spin state and the local field, and operation conditions 52 for executing the optimum solution search process such as the number of iterations of operation are input to the Ising calculation device 1 as parameters (step S152).

Thereafter, the Ising calculation device 1 executes the operation (step S153). This process is the optimum solution search process by the Ising calculation device 1 described above. By executing this operation, a calculation result 56 is obtained.

The user acquires the calculation result 56 (step S154). Then, the user interprets the acquired calculation result 56 (step S155). With the Interpretation, the user obtains the calculation result 56 for the problem to be solved with respect to the problem to be solved 51.

As described above, the Ising calculation device according to the present embodiment introduces the auxiliary spin capable of taking multiple values and performs the search process for the optimization problem having the range constraint. As a result, an Increase in resources for setting the conditions of the range constraint can be suppressed, and the scale of the problem to be dealt with can be increased. Furthermore, the ratio of the auxiliary spin to the normal spin can be suppressed to a low value, the search efficiency can be improved, and the time to reach the minimum energy can be shortened. Therefore, the processing performance of the Ising calculation device for the combinatorial optimization problem, particularly the processing performance for solving the optimization problem having the range constraint can be improved.

(Modification)

The above description has been made using the case where the initial value of the auxiliary spin is 0, but the initial value of the auxiliary spin can be another value. For example, the initial value of the auxiliary spin may be another lower limit value. Moreover, in the case where the initial value of the auxiliary spin is set to the lower limit value such as 0, it takes time for the auxiliary spin value to reach the upper limit value, so that extra time is needed when the vicinity of the upper limit value is close to the optimum solution. Therefore, the initial value of the auxiliary spin may be set to the upper limit value.

The evaluation function in the case where the initial value of the auxiliary spin is set to the upper limit value is expressed by the following formula (15). Here, C represents the upper limit value.

[Formula. 15]

$$E = -\sum_{n} p_n\, x_n + k\left(c - \sum_{m} y_m - \sum_{n} w_n\, x_n\right)^2 \quad (15)$$

Here, in the case of $M = \Sigma y_m$, the formula (15) can be transformed as in the transformation 14 of FIG. 9. FIG. 9 is a diagram illustrating a calculation example regarding the auxiliary spins according to the modification of the first embodiment. The difference in the case of increasing the value of $y_0$ from M to M+1 and the difference in the case of decreasing the value of $y_0$ from M to M−1 from the transformed formula of the transformation 14 are expressed by the formula 15. In this case as well, by setting the term after the addition or subtraction after k as the local field in the auxiliary spin $y_0$, the energy change amount and the change amount in the value of the local field when the spin state has changed can be calculated by the formulas (11) and (12).

Therefore, the annealing unit 10, the inverted spin selection unit 50, the energy calculation unit 60, and the search result holding unit 70 can similarly perform the operation to the first embodiment and execute the optimum solution search process. Note that, in this case, since the control to decrease the value setting the initial value of the auxiliary bit as the upper limit value is performed, the search time can be shortened when the optimum solution is obtained in a range close to the upper limit value. For example, in the case of a knapsack problem, the capacity of the knapsack is the upper limit value, and the optimum solution can be obtained in the range close to the upper limit value. Therefore, the search time to reach the optimum solution can be shortened by adopting the method of decreasing the value from the upper limit value as in the modification.

Second Embodiment

Next, a second embodiment will be described. An Ising calculation device according to the present example is different from that in the first example in giving a priority in selecting which of an addition flag or a subtraction flag is made valid in a case where both of addition candidate determination and subtraction candidate determination are possible. An Ising calculation device 1 and an annealing unit 10 according to the present embodiment are also illustrated in FIGS. 1 and 3. In the following description, description of operation of each unit similar to that of the first embodiment is omitted.

A flag generation unit 105 of the annealing unit 10 according to the present embodiment has three selection methods of "addition priority", "subtraction priority", and "random" as the method of selecting the addition flag and the subtraction flag. Then, the flag generation unit 105 receives an instruction from the operator and adopts a selection method designated by the operator from the three "addition priority", "subtraction priority", and "random".

In a case where an own spin is an auxiliary spin, the flag generation unit 105 receives inputs of a spin state of a case of adding 1 and an auxiliary spin of a case of subtracting 1. Then, the flag generation unit 105 identifies availability of addition candidate determination according to whether the spin state of a case of adding 1 is equal to or smaller than an upper limit value. Furthermore, the flag generation unit 105 identifies availability of subtraction candidate determination according to whether the spin state of a case of subtracting 1 is equal to or larger than a lower limit value. Then, the flag generation unit 105 generates an inversion candidate flag in a case where an energy change amount satisfies an inversion determination formula.

Moreover, in the case where both the addition candidate determination and the subtraction candidate determination are possible, the flag generation unit 105 selects either one of the determinations. At this time, when the addition priority is adopted as the selection method, the flag generation unit 105 preferentially selects and makes the addition flag valid. Furthermore, when the subtraction priority is adopted as the selection method, the flag generation unit 105 preferentially selects and makes the subtraction flag valid. In contrast, when the random is adopted as the selection method, the flag generation unit 105 randomly selects and makes the addition flag or the subtraction flag valid.

For example, a case of searching for an optimum solution of a knapsack problem will be described as an example. In this case, by giving priority to addition, more search processes for the optimum solution with a value closer to the upper limit value are executed than the case of random selection.

In the case of a knapsack problem, the auxiliary spin is the capacity of the knapsack, and the total value of items is likely to become higher as the value is larger. Therefore, by giving priority to addition and obtaining the optimum solution with a value close to the upper limit value, a search time to reach the optimum solution can be shortened.

Moreover, in a case of using a plurality of auxiliary spins taking multiple values, which of the addition or subtraction is prioritized may be different for each auxiliary spin. Therefore, a setting register may be prepared for each annealing unit 10 having each auxiliary spin as the own spin, so that a selection rule by the flag generation unit 105 can be switched according to a set value.

As described above, the Ising calculation device according to the present embodiment can preferentially select either the addition or subtraction in the case where both the spin state where addition has been performed and the spin state where subtraction has been performed for the value of the auxiliary spin are selectable as an inverted spin. Depending on a target problem, for example, the time to reach the optimum solution can be shortened when giving priority to addition, or the time to reach the optimum solution can be shortened when giving priority to subtraction. Therefore, by giving priority and selecting addition or subtraction for the value of the auxiliary spin, the time to reach the optimum solution can be shortened, and the process performance of the Ising calculation device for the combinatorial optimization problem can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present Invention have been described in detail, it should be understood that the various changes, substitutions, and alterations could be made hereto without departing from the spirit and scope of the invention.

What is claimed is:

1. An optimization apparatus comprising:
a temperature control circuit to control a temperature value indicating a temperature,
annealing circuits configured to:
calculate a change amount of energy represented by an evaluation function the evaluation function including a plurality of binary state variables and at least one multi-valued auxiliary spin which represents a range constraint for a sum related to the plurality of binary state variables, and
a processor coupled to the temperature control circuit and the annealing circuits and configured to:
determine whether to set a state change in any of the binary state variables or the multi-valued auxiliary spin as a candidate according to a correlation between a threshold and a total change amount, the threshold being calculated based on the temperature value and a random number value, the total change amount being obtained by the calculated change amount of energy, the state change for the multi-valued auxiliary spin comprises incrementing or decrementing its value by 1 to traverse a continuous integer range of the range constraint,
stochastically determine whether to adopt the state change set as the candidate,
calculate post-transition energy after executing a state transition of the state variable according to the state change, and
obtain minimum energy by setting the post-transition energy as the minimum energy when the post-transition energy is less than the minimum energy.

2. The optimization apparatus according to claim 1, wherein the annealing circuits do not set the state change in the state variable as the candidate when the state of the state variable taking the at least three values in the case of changing the state does not fall within a range of an upper limit value or a lower limit value determined in advance.

3. The optimization apparatus according to claim 2, wherein the annealing circuits perform an addition state change of adding a value of 1 and a subtraction state change of subtracting a value of 1 when the state variable taking the at least three values, and select and set either the addition state change or the subtraction state change as the candidate when both the addition state change and the subtraction state change fall within the range.

4. The optimization apparatus according to claim 3, wherein the annealing circuits give priority for selection to the addition state change and the subtraction state change and select the addition state change or the subtraction state change based on the priority.

5. The optimization apparatus according to claim 2, wherein the annealing circuits set the upper limit value or the lower limit value for an initial value of the state variable taking multiple values.

* * * * *